United States Patent [19]

Umeda

[11] Patent Number: 4,499,513
[45] Date of Patent: Feb. 12, 1985

[54] RECORDING AND/OR REPRODUCING APPARATUS

[75] Inventor: Hiroyuki Umeda, Yokohama, Japan

[73] Assignee: Victor Company of Japan, Ltd., Yokohama, Japan

[21] Appl. No.: 342,926

[22] Filed: Jan. 26, 1982

[30] Foreign Application Priority Data

Jan. 31, 1981 [JP] Japan .................. 56-13264
Jan. 31, 1981 [JP] Japan .................. 56-13266

[51] Int. Cl.³ .............. G11B 15/30; G11B 23/04; G11B 15/66; G11B 15/32
[52] U.S. Cl. ..................... 360/96.3; 360/85; 360/132; 242/200
[58] Field of Search ............ 360/85, 96.3, 96.4, 360/132; 242/192, 199, 200, 201, 203

[56] References Cited

U.S. PATENT DOCUMENTS

| | | | |
|---|---|---|---|
| 3,373,951 | 3/1968 | Mazoyer | 242/200 |
| 3,821,800 | 6/1974 | Maltese | 360/96.4 |
| 4,010,493 | 3/1977 | Cicatelli | 242/201 |
| 4,029,269 | 6/1977 | Clarridge | 242/201 |
| 4,102,517 | 7/1978 | Cicatelli | 242/201 |

FOREIGN PATENT DOCUMENTS

| | | |
|---|---|---|
| 2242808 | 3/1974 | Fed. Rep. of Germany . |
| 2262849 | 6/1974 | Fed. Rep. of Germany . |
| 2658586 | 7/1977 | Fed. Rep. of Germany . |
| 2089319A | 6/1982 | United Kingdom . |
| 2091212A | 7/1982 | United Kingdom . |

Primary Examiner—Robert S. Tupper
Attorney, Agent, or Firm—Louis Bernat

[57] ABSTRACT

A recording and/or reproducing apparatus performs recording and/or reproduction with a tape cassette having a cassette case and a supply side reel and a take-up side reel provided within the cassette case for winding a tape. The recording and/or reproducing apparatus comprises a reel driving shaft relatively entering from the bottom of the cassette case to engage with a center part of one reel of the supply side and take-up side reels when the tape cassette is loaded into a predetermined position of the recording and/or reproducing apparatus, to rotate the one reel, and a rotation transmitting mechanism for engaging with a part of the other reel, at a part other than a center part thereof, to rotate the other reel.

16 Claims, 19 Drawing Figures

RECORDING AND/OR REPRODUCING APPARATUS

BACKGROUND OF THE INVENTION

The present invention generally relates to recording and/or reproducing apparatuses, and more particularly to an apparatus for performing recording and/or reproduction with a miniature type tape cassette which is smaller than a standard type tape cassette designed for a standard type recording and/or reproducing apparatus. The recording and/or reproducing apparatus according to the present invention uses the same formats as the standard type recording and/or reproducing apparatus with respect to the formation of track patterns onto a tape, signal processing, and the like. The miniature type tape cassette which is recorded and/or reproduced with the recording and/or reproducing apparatus according to the present invention, is recorded and/or reproduced when loaded into the standard type recording and/or reproducing apparatus in a state accommodated within a tape cassette adapter.

Presently, video signal recording and/or reproducing apparatuses using tape cassettes are reduced to practical use on the world-wide basis. As types of these recording and/or reproducing apparatuses using tape cassettes, two or three standardized types of apparatuses presently exist worldwidely. There is no interchangeability between apparatuses of different standards, however, the interchangeability exists between apparatuses adopting the same standard. Accordingly, a tape cassette recorded by one recording and/or reproducing apparatus can be reproduced by another recording and/or reproducing apparatus of the same standard. Hence, in order to ensure the interchangeability between different recording and/or reproducing apparatuses manufactured by different manufacturers so as to perform recording and/or reproduction, a standardization is established with respect to formats of the tape cassette and the recording and/or reproducing apparatus. In other words, the above formats are standardized for each standard, and a standard type tape cassette and a standard type recording and/or reproducing apparatus are respectively manufactured and marketed under each standard.

Recently, a problem of much importance involves the realization in reducing the size of the recording and/or reproducing apparatus main body. This is to develop a more compact portable type recording and/or reproducing apparatus, and, for example, to realize such an equipment that a recording apparatus is unitarily built into a television camera.

In this regard, some attempts have been made to develop a compact type recording and/or reproducing apparatus using a compact or miniature type tape cassette, which uses a tape pattern and format completely different from those of the standard type recording and/or reproducing apparatus using the standard type tape cassette which are already and widely accepted in the market. However, such compact type recording and/or reproducing apparatus attempted for realization uses a format completely different from that of the standard type recording and/or reproducing apparatus, and the interchangeability does not exist therebetween. Therefore, in this compact type recording and/or reproducing apparatus, there is a disadvantage in that a tape cassette recorded by the compact type recording and/or reproducing apparatus cannot be reproduced by the standard type recording and/or reproducing apparatus. This is a great inconvenience and disadvantage to the owners of the compact type recording and/or reproducing apparatus.

Another attempt has also been made to realize a compact type portable recording and/or reproducing apparatus which performs recording and/or reproduction with the same tape pattern and format as the standard type recording and/or reproducing apparatus, by using a tape cassette whose size is slightly reduced by reducing the tape quantity and the diameter of the reels from those of the standard type tape cassette. In this system, a tape cassette recorded by the portable recording and/or reproducing apparatus can be reproduced as it is by the standard type recording and/or reproducing apparatus.

However, in the tape cassette used in the above portable recording and/or reproducing apparatus, the distance between a supply side reel and a take-up side reel is kept equal to the distance between the supply side and take-up side reels of the standard type tape cassette, so that the tape cassette used for the portable recording and/or reproducing apparatus can be loaded into the standard type recording and/or reproducing apparatus. On the other hand, even when the tape quantity is reduced in order to reduce the diameter of the reels, there is a limit of practicality in reducing the diameter of these reels. Therefore, in this system, there was a disadvantage in that the size of the tape cassette as a whole could not be reduced significantly, and the same is true to the recording and/or reproducing apparatus.

Furthermore, another system is conceivable in which the tape quantity is reduced to reduce the diameter of the reels, and further, the miniature type tape cassette is constructed by reducing the distance between the supply side and take-up side reels. In this system, as a modification of the standard type recording and/or reproducing apparatus, the recording and/or reproducing apparatus can be constructed so that a reel disc for driving the take-up side reel is movable. In this modification of the standard type recording and/or reproducing apparatus, the take-up side reel disc is at a normal position when loaded with the standard type tape cassette, and the take-up side reel disc is moved to a position closer to the supply side reel disc when loaded with the miniature type tape cassette.

However, even in this system, for example, there is a disadvantage in that the miniature type tape cassette recorded by the compact type recording and/or reproducing apparatus cannot be reproduced by the standard type recording and/or reproducing apparatus which is presently in wide use. Moreover, there is a disadvantage in that it is extremely difficult to realize a mechanism for moving the reel disc in the manner described above. Furthermore, the recording and/or reproducing apparatus using the tape cassette generally has a mechanism for drawing out the tape from inside the tape cassette to load the tape onto a predetermined tape path within the recording and/or reproducing apparatus. Therefore, it is also exceedingly difficult to construct the above mechanism for pulling out the tape, so as to ensure the interchangeability with respect to the above compact or miniature type tape cassette and the standard type tape cassette. Practically, realization of such a mechanism is virtually impossible.

SUMMARY OF THE INVENTION

Accordingly, it is a general object of the present invention to provide a novel and useful recording and/or reproducing apparatus in which the above described disadvantages have been overcome.

Another and more specific object of the present invention is to provide a recording and/or reproducing apparatus for performing recording and/or reproduction when loaded with a tape cassette which is smaller than a standard type tape cassette which is originally designed for a standard type recording and/or reproduction to perform recording and/or reproduction. When a miniature type tape cassette is loaded into the standard type recording and/or reproducing apparatus, the miniature type tape cassette is accommodated within a tape cassette adapter having an external form and size substantially equal to those of the standard type tape cassette.

Still another object of the present invention is to provide a recording and/or reproducing apparatus having a reel driving shaft for entering into one reel of a miniature type tape cassette from the bottom of a cassette case to engage with the center part of the above one reel and rotate the one reel when the miniature type tape cassette is loaded into the recording and/or reproducing apparatus, and a driving mechanism for transmitting rotation to the other reel at a part other than the center part thereof to rotate the other reel.

Other objects and further features of the present invention will be apparent from the following detailed description when read in conjunction with the accompanying drawings.

DETAILED DESCRIPTION

Figure 1:
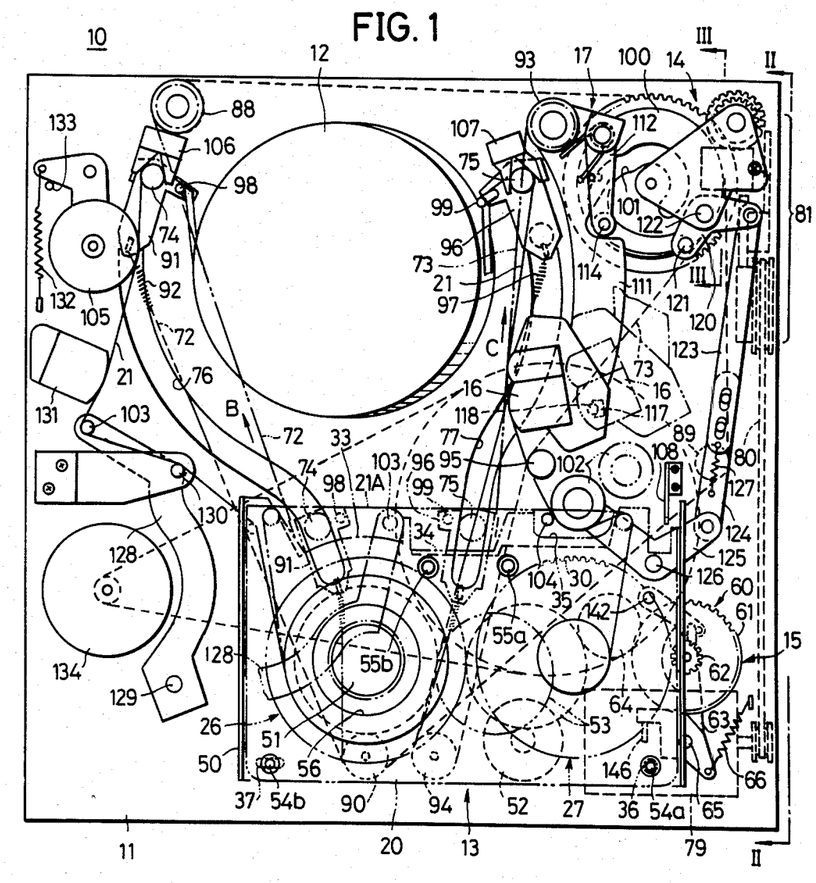
FIG. 1 is a plan view showing an embodiment of a recording and/or reproducing apparatus according to the present invention in a recording or a reproducing mode.

In FIG. 1, a recording and/or reproducing apparatus 10 exclusively designed for a miniature type tape cassette, is directly loaded with a tape cassette which is smaller than a standard type tape cassette. The apparatus 10 is more compact and light-weight than a recording and/or reproducing apparatus for the standard type tape cassette.

Figure 2:
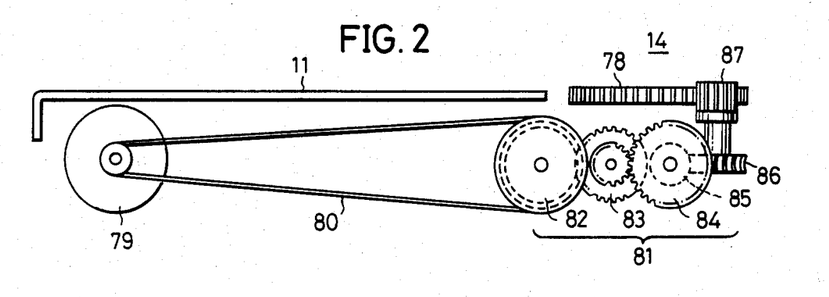
FIGS. 2 and 3 are perspective views respectively showing a tape loading mechanism of the apparatus shown in FIG. 1 along a line II—II and a line III—III in FIG. 1.
Figure 3:
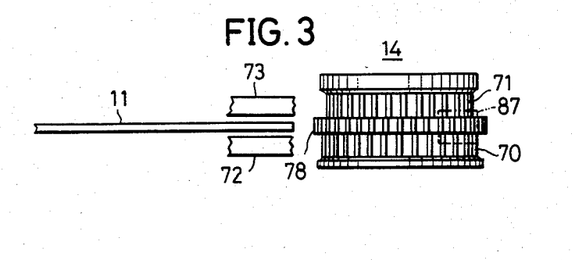
Figure 4A:
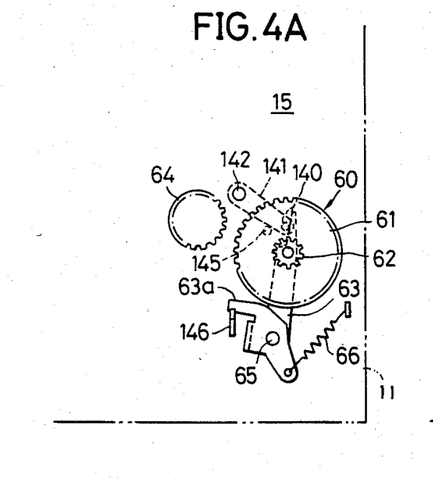
FIGS. 4A and 4B are plan views respectively showing a rotation transmitting mechanism of the apparatus shown in FIG. 1 in states before and after loading of a miniature type tape cassette.
Figure 4B:
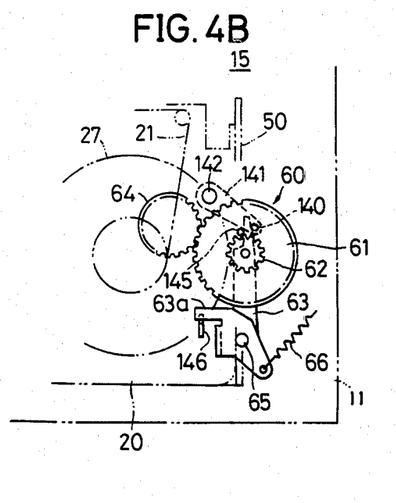

The above apparatus 10 is constructed substantially by providing a guide drum 12 and a cassette loading part 13 on a chassis 11, and providing a tape loading mechanism 14 shown in FIGS. 2 and 3 and the like underneath the chassis 11. In addition, a rotation transmitting mechanism 15 shown in FIGS. 4A and 4B is provided adjacent to the cassette loading part 13. Moreover, an audio and control head moving mechanism 17 shown in FIGS. 5A and 5B for moving an audio and control head 16, is provided on the chassis 11. The audio and control head moving mechanism 17 moves the audio and control head 16 to a certain position in relation to a tape loading operation, so that the audio and control head 16 makes contact with the tape.

First, description will be given with respect to constructions of a miniature type tape cassette which is loaded into the above apparatus 10, and a miniature type tape cassette loading part.

As shown in FIGS. 6 through 10, a miniature type tape cassette 20 consists of a cassette case 22 accommodating a magnetic tape 21, and a lid 23 provided at the front of the cassette case 22 in a state where the lid 23 is free to open and close. The cassette case 22 is assembled of an upper half 24 and a lower half 25. The lid 23 pivots between a closed position indicated in FIG. 6 and an open position indicated in FIG. 7, and is held at the above two positions with a detent action.

Figure 8:
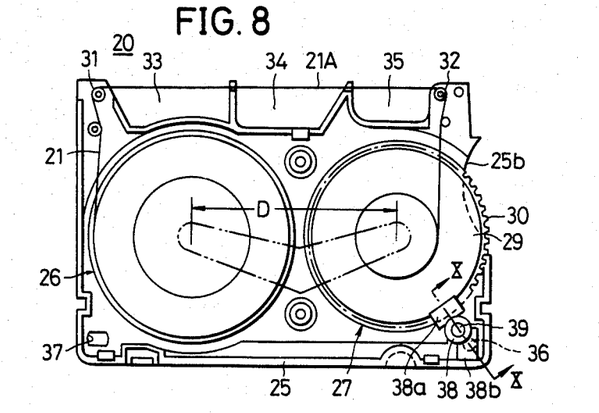
FIG. 8 is a plan view showing the tape cassette shown in FIG. 6 with an upper half removed.
Figure 9:
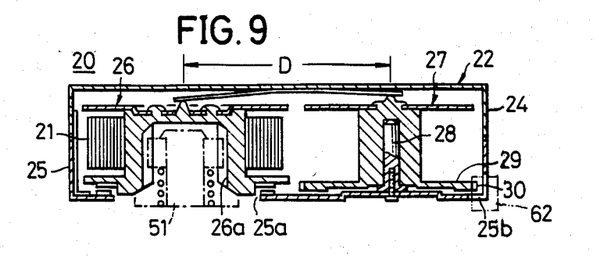
FIG. 9 is a diagram showing the tape cassette shown in FIG. 6 in a cross section.

A supply side reel (supply reel) 26 and a take-up side reel (take-up reel) 27 are provided side by side inside the cassette case 22, as shown in FIGS. 8 and 9. A distance D between centers of the above reels 26 and 27, is shorter than the distance between centers of reels of the standard type tape cassette. The supply reel 26 is formed with a reel driving shaft inserting part 26a, and this reel driving shaft inserting part 26a is provided in a state where the reel driving shaft inserting part 26a is exposed through an opening 25a in the lower half 25. The take-up reel 27 is fitted over a fixed shaft 28 which is embeddedly provided on the lower half 25, in a freely rotatable manner. A gear part 30 is formed at the peripheral part of a lower flange of the take-up reel 27. A part of the gear part 30 is exposed through a window 25b which is extending from the side to bottom of the lower half 25.

The magnetic tape 21 is guided by guide poles 31 and 32 provided on the left and right sides, and forms a tape path 21A along the front surface of the cassette case 22.

Cutouts 33, 34, and 35 are formed at the front of the cassette case 22. Furthermore, a pair of positioning holes 36 and 37, are provided on the right and left sides, at the rear bottom area of the cassette case 22.

Figure 10:
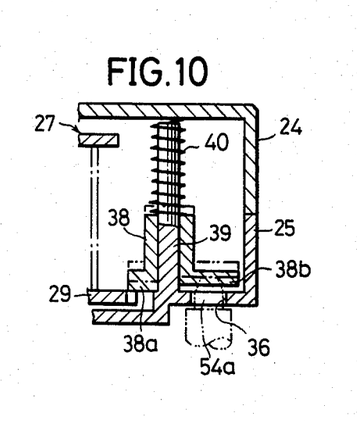
FIG. 10 is a diagram showing a braking mechanism within the tape cassette in a cross section along a line X—X in FIG. 8.

As shown in FIGS. 8 and 10, a braking member 38 is provided with respect to the take-up reel 27. The braking member 38 is fitted over a projecting column 39, and urged downwards by a compressed coil spring 40. A brake shoe part 38a of the braking member 38 depresses the upper peripheral part of the lower flange 29, to perform a braking action with respect to the take-up reel 27. An engaging part 38b of the braking member 38 covers the above positioning hole 36.

Figure 11:
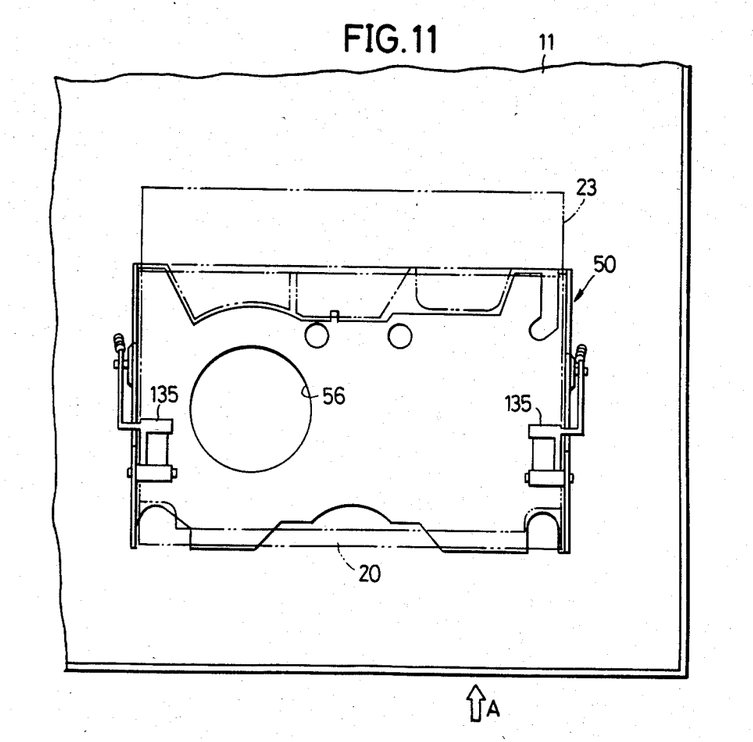
FIG. 11 is a plan view showing a cassette housing of the apparatus.
Figure 12:
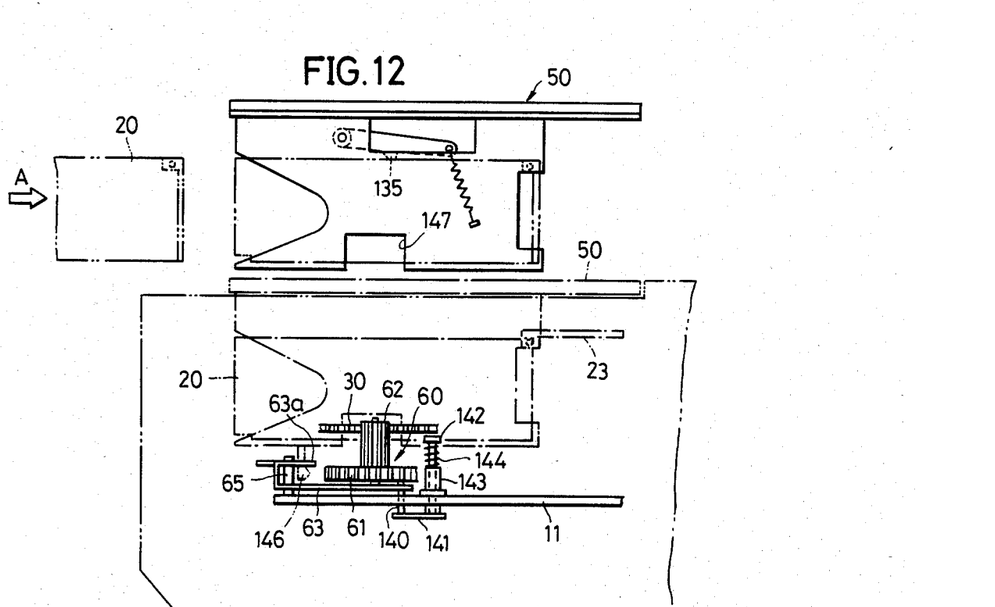
FIG. 12 is a side view showing a cassette housing of the apparatus together with the rotation transmitting mechanism shown in FIG. 4A.

The above described tape cassette 20 is inserted into a cassette housing 50 as shown in FIGS. 11 and 12, and loaded into the cassette loading part 13.

The above cassette loading part 13 is smaller than a tape cassette loading part of the standard type recording and/or reproducing apparatus which operates together with the standard type tape cassette. As shown in FIG. 1, only a supply reel driving shaft 51 is provided in the cassette loading part 13, and a take-up reel driving shaft is not provided. The supply reel driving shaft 51 is rotated by a reel driving motor 52 through an idler 53 which swings towards the supply reel 26. In addition, a pair of positioning pins 54a and 54b are provided in a manner projecting from the cassette loading part 13.

The rotation transmitting mechanism 15 is provided adjacent to the cassette loading part 13, and consists of a gear structure 60 as shown in FIGS. 4A and 4B. The gear structure 60 consists of a large-diameter gear 61 and a small-diameter gear 62 which are unitarily constructed, and is supported on a swing arm 63 in a freely rotatable manner. The large-diameter gear 61 is at a height position opposing an intermediate gear 64, and the small-diameter gear is at a height position opposing the gear part 30 of the supply reel 27 in the tape cassette 20 which is loaded. The above swing arm 63 is axially supported by a pin 65 and is urged counterclockwise by a spring 66. As will be described hereinafter, this swing arm 63 rotates in response to the loading and unloading of the tape cassette 20, to move the gear structure 60 to an operational or a non-operational position.

Next, description will be given with respect to the tape loading mechanism and the mechanisms related to the tape loading mechanism.

As shown in FIGS. 2 and 3, timing gears 70 and 71 respectively rotate to drive timing belts 72 and 73 in the tape loading mechanism 14. When the timing belts 72 and 73 are driven and travel, loading poles 74 and 75 respectively move from original positions indicated by two-dot chain lines to loading completed positions indicated by solid lines, along guide grooves 76 and 77.

The timing gears 70 and 71 are connected by a gear 78 provided therebetween and by a pin and a spring. The timing gears 70 and 71 are rotated by a loading motor 79 through a belt 80 and a gear mechanism 81 for reducing the rotational speed. Hence, the timing gears 70 and 71 are rotated clockwise upon loading of the tape, and rotated counterclockwise upon unloading of the tape. The gear mechanism 81 consists of a gear 82, a stepped gear 83, a gear 84, a worm 85, a worm gear 86, and a gear 87 which meshes with the gear 78.

The timing belt 72 is extended along the timing gear 70 and gears 88, 89, and 90. One end of the timing belt 72 is directly connected to a support 91, and the other end of the timing belt 72 is connected to the same support 91 through a coil spring 92, to form a loop below the chassis 11. On the other hand, the other timing belt 73 is extended along the timing gear 71, gears 93 and 94, and a guide pole 95. One end of the timing belt 73 is directly connected to a support 96, and the other end of the timing belt 73 is connected to the same support 96 through a coil spring 97, to form a loop above the chassis 11. The loops formed by the above timing belts 72 and 73 before the tape is loaded, are indicated by two-dot chain lines. The supports 91 and 96 are respectively fitted within the guide grooves 76 and 77, so that the supports 91 and 96 respectively are movable to slide along the guide grooves 76 and 77. The loading pole 74 and a slant pole 98 are embeddedly provided on the support 91. While the loading pole 75 and a slant pole 99 are embedded on the support 96.

Figure 5A:
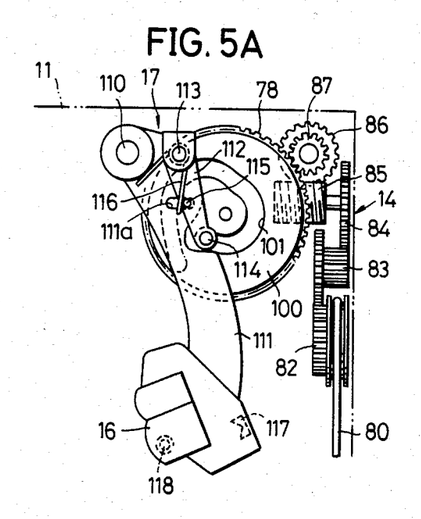
FIGS. 5A and 5B are plan views respectively showing an audio and control head moving mechanism of the apparatus shown in FIG. 1 before and after operation of the audio and control head moving mechanism.
Figure 5B:
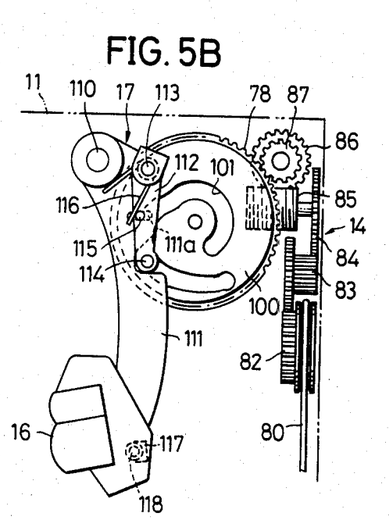
Figure 6:
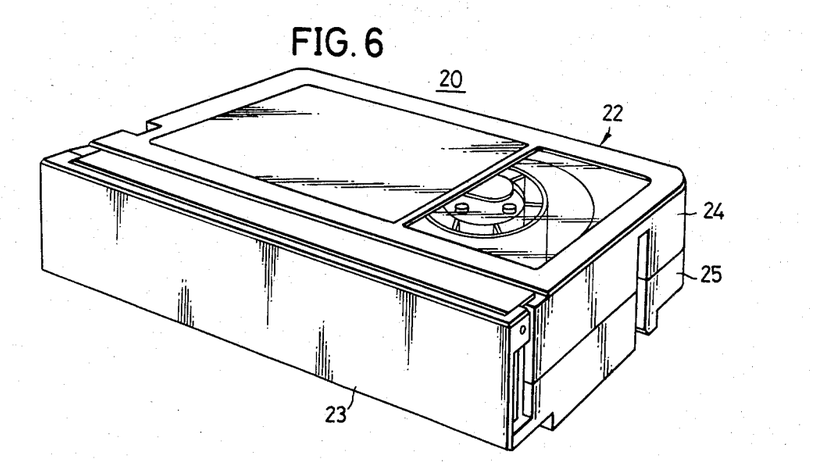
FIG. 6 is a perspective view seen from the upper side showing a miniature type tape cassette which can be applied to the apparatus shown in FIG. 1.

A cam body 100 shown in FIGS. 5A and 5B rotates unitarily with the timing gear 71. A cam groove 101 is formed in the cam body 100. By the rotation of the above cam body 100, the audio and control head 16 and a pinch roller 102 are moved as described hereinafter. Before the tape is loaded, the head 16 and the pinch roller 102 respectively are in positions indicated by two-dot chain lines in FIG. 1. That is, the head 16 is at a position receded from the guide groove 77 so as not to interfere with the tape loading operation, and the pinch roller 102 is at a position remote from the cassette loading part.

Next, description will be given with respect to the loading operation of the tape cassette 20 into the loading part 13, the succeeding tape loading operation, and the recording and/or reproducing operation.

Figure 7:
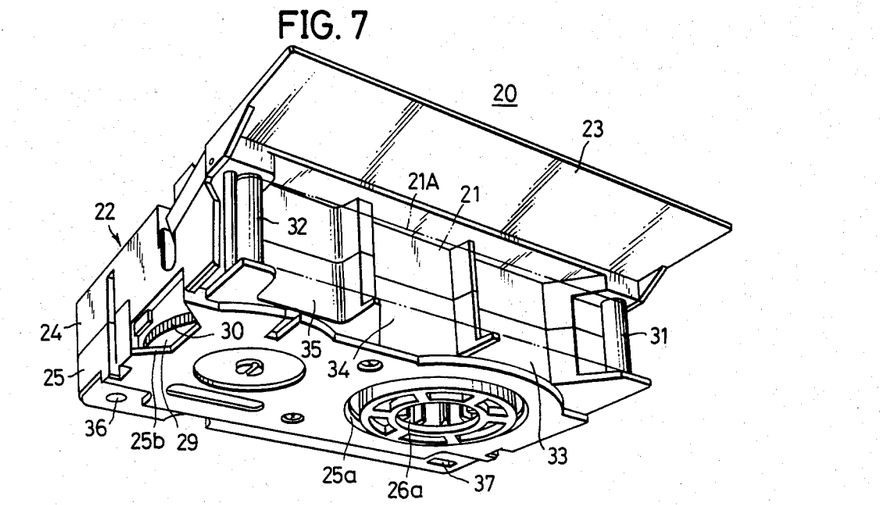
FIG. 7 is a perspective view seen from the lower side showing the tape cassette shown in FIG. 6 in a state where a lid of the tape cassette is open.

As shown in FIGS. 1, 11, and 12, the tape cassette 20 is inserted into the cassette housing 50 from the side of the lid 13 by inserting the tape cassette 20 in the direction of an arrow A. The tape cassette 20 is then brought downwards together with the housing 50, and is loaded into the cassette loading part 13. During this tape cassette loading operation, the positioning pins 54a and 54b relatively enter into the corresponding positioning holes 36 and 37, respectively, to locate the tape cassette 20 with respect to the horizontal direction. Furthermore, the rear part at the bottom surface of the tape cassette 20 is held by stepped surfaces of the positioning pins 54a and 54b, and the front part at the bottom surface of the tape cassette 20 is held by a pair of pins 55a and 55b, to locate the tape cassette 20 with respect to the direction of its height. The positioning pin 54a in particular passes through the hole 36 as shown in FIG. 10 to make contact with the engaging part 38b of the braking member 38, and pushes the braking member 38 upwards against the force exerted by the spring 40. Accordingly, the brake shoe part 38a separates from the reel flange 29, and the braking action with respect to the take-up reel 27 is released. In addition, accompanied by the downward movement of the tape cassette 20 and the cassette housing 50, the supply reel driving shaft 51 projects within the housing 50 through the hole 56, to relatively enter within the inserting part 26a of the supply reel 26 and engage with the supply reel 26. Moreover, by the above downward movement of the tape cassette 20 and the cassette housing 50, the loading pole 74, the pole 98, and a tension pole 103 respectively enter within the cutout 33, the loading pole 75 and the pole 99 respectively enter within the cutout 34, and a capstan 104 relatively enters within the cutout 35. Furthermore, an engaging member 108 engages with the lid 23, to open the lid 23 as shown in FIGS. 7, 11, and 12, accompanied by the downward movement of the tape cassette 20.

In addition, the rotation transmitting mechanism 15 operates, and the small-diameter gear 62 meshes with the gear part 30 of the take-up reel 27, while the large-diameter gear 61 meshes with the intermediate gear 64. Description of the rotation transmitting mechanism at this point, will be given hereinafter.

When a recording or reproducing operation is performed, the motor 79 is started, and the timing gears 70 and 71, and the cam body 100 rotate clockwise. The timing belts 72 and 73 respectively travel in the directions of arrows B and C due to the rotation of the timing gears 70 and 71, and the supports 91 and 96 respectively move along the guide grooves 76 and 77. At this point, the poles 74 and 75 intercept and engage with the magnetic tape 21, to draw the magnetic tape 21 out of the tape cassette 20. The support 91 moves pushing an impedance roller 105 away, and the loading pole 74 is finally pushed against and held by a stopper 106. The support 96 moves passing in front of the audio control head 16 which is at the receded position, and the loading pole 75 is finally pushed against and held by a stopper 107.

Due to the rotation of the cam body 100, the state of the head moving mechanism 17 changes from the state shown in FIG. 5A to the state shown in FIG. 5B. The control head 16 is mounted at the tip end of a support arm 111 which is axially supported by a shaft 110. A supplemental arm 112 is axially supported by a pin 113 provided on the support arm 110, and has a pin 114 provided at the tip end thereof. The pin 114 fits within the cam groove 101. Moreover, a pin 115 of the arm 112 fits within a longitudinal hole 111a of the support arm 111. A spring 116 is provided between the support arm 111 and the arm 112, and this spring 116 urges the arm 112 counterclockwise.

That is, by the rotation of the cam body 100, after the loading pole 75 passes in front of the audio and control head 16, the pin 114 is guided by the cam groove 101 to move towards the outer peripheral of the cam body 100. Hence, the support arm 111 and the arm 112 unitarily rotate clockwise, and the head 16 approaches the magnetic tape 21, which is drawn outside the tape cassette 20, to make contact with the magnetic tape 21 finally. At the final stage, as shown in FIGS. 1 and 5B, the arm 112 rotates independently from the support arm 111, and the support arm 111 urged the clockwise by the force of the spring 116. Hence, a V-shaped stopper 117 at the lower surface of the support arm 111 engages with and is held by an engaging pin 118 provided on the chassis 11. Accordingly, the head 16 becomes positively positioned at a predetermined position. Moreover, since the V-shaped stopper 117 engages with a V-shaped narrow-diameter part of the engaging pin 118, the head 16 is also positioned with respect to the direction of its height.

In addition, by the rotation of the cam body 100, a pin 121 of a bell crank lever 120 is guided by the cam groove 101 to rotate counterclockwise the bell crank lever 120 about a shaft 122, as shown in FIG. 1. Further, a pinch roller support arm 125 is rotated about a shaft 126 counterclockwise through a connection levers 123 and 124, and the pinch roller 102 pushes against the capstan 104. The pushing force of the pinch roller 102 with respect to the capstan 104 is produced by a force exerted by a coil spring 127 provided between the levers 123 and 124.

Furthermore, due to the rotation of the cam body 100, a tension arm 128 is rotated about a shaft 129 counterclockwise through a link mechanism (not shown).

Accordingly, the recording and/or reproducing apparatus 10 is put into a state shown in FIG. 1. In this state, the magnetic tape 21 drawn out from the supply reel 26 makes contact with the impedance roller 105, after making contact with a guide pole 130, the tension pole 103, and a full-width erasing head 131. The impedance roller 105 is held in position at a predetermined position by a coil spring 132 and a stopper pin 133. The magnetic tape 21 further makes contact with the cylindrical surface of the guide drum 12 having rotary video heads, in a spiral manner, between the poles 98 and 99. While the magnetic tape 21 makes contact with and travels with respect to the guide drum 12, a video signal is recorded onto or reproduced from the magnetic tape 21 by the rotary video heads.

After making contact with the guide drum 12, the magnetic tape 21 makes contact with the audio control head 16. Hence, the magnetic tape 21 is driven in a state pinched between the pinch roller 102 and the capstan 104 and enters within the tape cassette 20, to be taken-up by the take-up reel 27.

The above capstan 104 is rotated by a capstan motor 134. Moreover, due to the clockwise rotation of the motor 52, the idler 53 moves and pushes against the intermediate gear 64. Hence, the rotation of the motor 52 is transmitted to the take-up reel 27 through the idler 53, the intermediate gear 64, and the gear structure 60, to rotate the take-up reel 27 clockwise to take-up the magnetic tape 21.

In addition, the full-width erasing head 131, the audio and control head 16, and the guide drum 12 are respectively constructed under the same standard as corresponding heads and guide drum in the standard type recording and/or reproducing apparatus. Accordingly, the magnetic tape 21 is recorded and/or reproduced with the same tape pattern and format as in the standard type recording and/or reproducing apparatus.

When a stop operation is performed during a recording or reproducing mode, each mechanism which operated upon the tape loading operation operates in a reverse order and the opposite direction, to perform a tape unloading operation. Thus, the magnetic tape 21 drawn outside the tape cassette 20 is taken-up by the take-up reel 27 and accommodated within the tape cassette 20. Thereafter, the cassette housing 50 moves upwards, and the tape cassette 20 detach from the rotation transmitting mechanism 15. Hence, the tape cassette 20 is released from the cassette loading part 13 and then withdrawn from the cassette housing 50. At a halfway point during the withdrawal of the tape cassette 20 from the cassette housing 50, the lid 23 engages with a lever 135 and is automatically closed.

During a tape rewinding mode, the motor 52 rotates counterclockwise, and the idler 53 makes contact with the supply reel driving shaft 51. In this state, the rotation of the motor 52 is transmitted to the supply reel driving shaft 51, and is not transmitted to the gear structure 60.

Next, description will be given with respect to the operation of the rotation transmitting mechanism 15 upon loading and unloading of the tape cassette, by referring in particular to FIGS. 1, 4A, 4B, 12, and 13.

Figure 13:
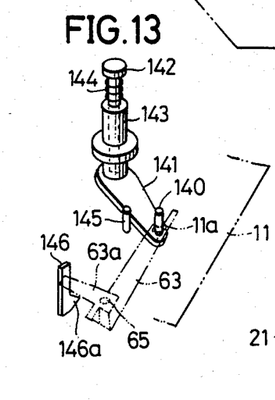
FIG. 13 is a perspective view showing a mechanism for moving and restricting the position of a gear structure of the rotation transmitting mechanism shown in FIG. 4A.

An engaging pin 140 is embedded on a support arm 141, and enters within a hole 11a in the chassis 11. The support arm 141 is fixed to the lower end of a cassette loading and unloading detection pin 142. The detection pin 142 fits into a sleeve 143 provided on the chassis 11, in a freely slidable manner, and is urged upwards by a coil spring 144.

Before the tape cassette is loaded, that is, when the cassette housing 50 is at the raised position, the engaging pin 140 projects above the chassis 11, and the detection pin 142 is at a height position where the detection pin 142 is pushed by the cassette housing 50 upon lowering of the cassette housing 50. The swing arm 63 engages with the engaging pin 140, and the gear structure 60 is displaced towards the right side from the cassette loading part 13.

When the cassette housing 50 and the tape cassette 20 are lowered to a position where the tape cassette 20 is loaded into the cassette loading part 13, the detection pin 142 is pushed downwards by the bottom of the cassette housing 50. Moreover, the engaging pin 140 recedes within the hole 11a. Accordingly, the engagement between the swing arm 63 and the engaging pin 140 is released, and the swing arm 63 is rotated counterclockwise by the spring 66 to a position indicated in FIG. 4B where the swing arm 63 engages with a stopper pin 145. Hence, the gear structure 60 moves horizontally to reach the operational position, and the large-diameter gear 61 meshes with the intermediate gear 64. The small-diameter gear 62 passes through a cutout window 147 provided at the side of the cassette housing 50 and the window 25b on the tape cassette 20, to partially enter within the tape cassette 20 and mesh with the gear part 30. Therefore, in this state, the rotation of the small-diameter gear 62 can be transmitted to the outer peripheral part of the lower flange 29 of the take-up reel 27 within the tape cassette 20. Furthermore, since the small-diameter gear 62 approaches the lower flange 29 from the side of the gear part 30 of the lower flange 29 to mesh with the gear part 30, the meshing operation can be performed smoothly.

When the cassette housing 50 is raised to unload the tape cassette 20 from the cassette loading part 13, an engaging piece 146 hanging from the cassette housing 50 pushes away an arm part 63a of the swing arm 63 by a sloping part 146a provided on the engaging piece 146. Hence, the swing arm 63 rotates clockwise against the force exerted by the spring 66, the gear structure 60 moves towards the right side, and the small-diameter gear 62 disengages from the gear part 30. The above swing arm 63 rotates to a position where the tip end of the swing arm 63 exceeds the position of the engaging pin 140. Moreover, accompanied by the rising of the cassette housing 50, the detection pin 142 is raised by the spring 144, and the engaging pin 140 projects over the chassis 11. The engaging pin 140 projecting over the chassis 11 engages with the swing arm 63, and the gear structure is accordingly maintained at the original position separated from the cassette loading part 13.

Figure 14:
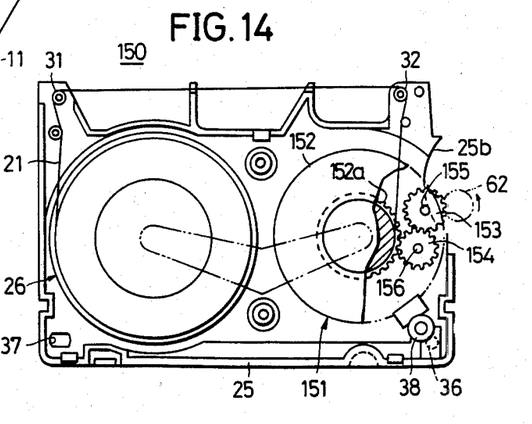
FIG. 14 is a plan view showing another example of a miniature type tape cassette which can be applied to the apparatus shown in FIG. 1, with an upper half removed and a part of a take-up side reel cut away.

FIG. 14 shows another embodiment of a miniature type tape cassette which can be applied to the above described embodiment of a recording and/or reproducing apparatus. A miniature type tape cassette 150 is identical to the above described tape cassette 20 except for the construction around the periphery of a lower flange of a take-up reel 151. A lower flange 152 of the take-up reel 151 is not provided with a gear part at the outer peripheral surface thereof Instead, the lower flange 152 is provided with a gear part 152a having a diameter which is smaller than that of the lower flange 152, at the lower surface thereof. In addition, two rotation transmitting gears 153 and 154 are respectively and axially supported by pins 155 and 156, on the lower half 25. Each of the gears 153 and 154 are provided at positions below the lower flange 152. A part of the gear 153 is exposed through the window 25b, and the gear 154 meshes with the gear part 152a and the gear 153.

When the above tape cassette 150 is loaded into the recording and/or reproducing apparatus 10, the gear 153 on the side of the tape cassette 150 and the small-diameter gear 62 on the side of the apparatus 10 mesh with each other. The rotation of the small-diameter gear 62 in the counterclockwise direction is transmitted to the gear part 152a through the gears 153 and 154, to rotate the take-up reel 151 clockwise.

Since the diameter of the gear part 152a is smaller than that of the lower flange 152, this tape cassette 150 is especially effective when the tape cassette 150 is accommodated within the tape cassette adapter and loaded into the standard type recording and/or reproducing apparatus. That is, the diameter of the take-up reel 152 in the tape cassette 150 is smaller than the diameter of the reel hub of the take-up reel in the standard type tape cassette. Accordingly, in order for the take-up reel 152 to take-up the magnetic tape which is successively fed, without introducing a slack in the magnetic tape, the take-up reel 152 must rotate at a predetermined speed which is higher than that of the take-up reel in the standard type tape cassette.

In the above tape cassette 150, since the diameter of the gear part 152a is smaller than the diameter of the lower flange 152, the take-up reel 151 can rotate at a speed which is higher than that of the take-up reel 27 in the tape cassette 20. Thus, even when the tape cassette 150 is loaded and used with respect to a standard type recording and/or reproducing apparatus in which the rotational speed of the take-up reel driving shaft is set to a low speed, the take-up reel 151 is rotated at a sufficiently high speed. Therefore, the magnetic tape which is successively fed, is taken-up by the take-up reel 151 without introducing a slack in the magnetic tape.

Furthermore, when the above tape cassette 150 is used as the miniature type tape cassette, in the recording and/or reproducing apparatus 10 shown in FIG. 1, the rotational speed of the small-diameter gear 64 required to rotate the take-up reel 151 at the above predetermined rotational speed can be a considerably low in contrast to the case where the above described tape cassette 20 is used. Accordingly, the rotationally driving mechanism on the side of the recording and/or reproducing apparatus 10 can operate in a stable manner, and the serviceable life of the rotationally driving mechanism is extended.

Figure 15:
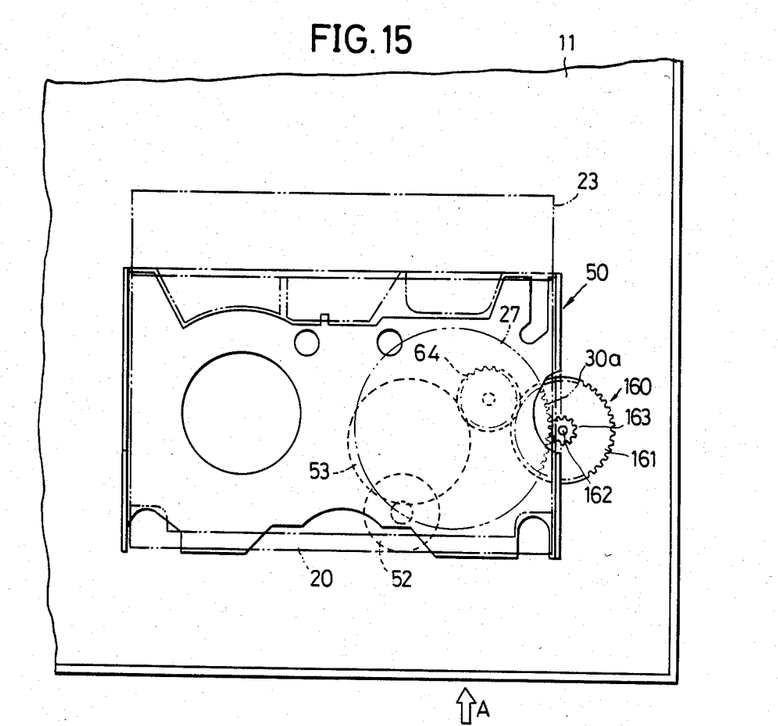
FIG. 15 is a plan view showing a rotation transmitting mechanism of another embodiment of a recording and/or reproducing apparatus according to the present invention.

FIG. 15 shows another embodiment of a rotation transmitting mechanism in the recording and/or reproducing apparatus according to the present invention. In FIG. 15, those parts which are the same as those corresponding parts in FIG. 1 are designated by the same reference numerals, and their descriptions will be omitted. In a rotation mechanism 160, a gear structure 161 is supported at a predetermined position on the chassis 11 by a pin 162 in a freely rotatable manner, and the gear structure 161 does not displace like the gear structure 60 described before. The gear structure 161 consists of the large-diameter gear 61 and a small-diameter gear 163. As shown in FIG. 16B, the small-diameter gear 163 has teeth 164, and the upper end side of each tooth 164 is formed with a tapered surface 164a.

Figure 16A:
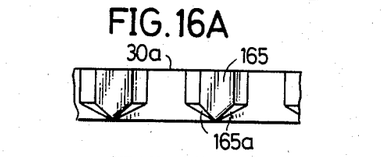
FIG. 16A is a diagram, in an enlarged scale, showing the shape of teeth at a gear part provided at the outer periphery of a lower flange of the take-up side reel in a miniature type tape cassette which can be applied with respect to a rotation transmitting mechanism of the apparatus shown in FIG. 15.
Figure 16B:
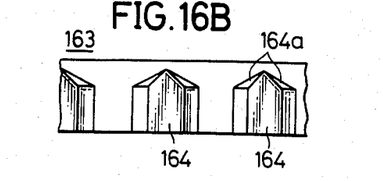
FIG. 16B is a diagram, in an enlarged scale, showing the shape of teeth of a small-diameter gear in the apparatus shown in FIG. 15.

In addition, as shown in FIG. 16A, the lower end side of each tooth 165 provided at the gear part 30a of the take-up reel 27 in the tape cassette, is formed with a tapered surface 165a.

Thus, the upper end sides of the teeth 164 and the lower end sides of the teeth 165, opposing each other, are respectively formed with the tapered surfaces 164a and 165a. Accordingly, regardless of the relative rotational positions of the small-diameter gear 163 and the take-up reel 27, the teeth 164 and 165 mesh smoothly being guided by the tapered surfaces 164a and 165a upon loading of the tape cassette 20. Therefore, the take-up reel 27 in the tape cassette 20 and the rotation transmitting mechanism 160 in the recording and/or reproducing apparatus are smoothly linked.

In the above rotation transmitting mechanism 160, as the gear structure 161 is provided stationary, a construction of rotation transmitting mechanism 160 is simplified.

Moreover, in each of the above embodiments of the invention, a rubber roller may be used instead of the small-diameter gear 62 (163) of the gear structure 60 (161) in the rotation transmitting mechanism 15 (160). In this case, the gear part is not formed around the peripheral side surface of the lower flange 29 of the take-up reel 27 in the tape cassette 20. Accordingly, rotation is transmitted from the rotation transmitting mechanism 15 (160) of the recording and/or reproducing apparatus 10 to the lower flange 29 of the take-up reel 27 within the tape cassette 20, by a friction introduced therebetween.

Further, the present invention is not limited to these embodiments, but various variations and modifications may be made without departing from the scope of the present invention.

What is claimed is:

1. A recording and/or reproducing apparatus for recording and/or reproduction when loaded with a tape cassette having a cassette case including a supply side reel and a take-up side reel for winding a tape, said recording and/or reproducing apparatus comprising:
   a reel driving shaft for relatively entering the bottom of said cassette case to engage a center part of and rotate one of said reels when said tape cassette is loaded into a predetermined position within said recording and/or reproducing apparatus;
   a rotation transmitting means for engaging a part of and rotating the other of said reels, with said engaging part being at a part other than a center part thereof; and
   means for alternatively driving the reel driving shaft and the rotation transmitting means in a direction in which said one reel and the other reel alternatively wind the tape.

2. A recording and/or reproducing apparatus as claimed in claim 1 in which said reel driving shaft engages with the supply side reel, and said rotation transmitting mechanism is constructed to rotate the take-up side reel.

3. A recording and/or reproducing apparatus as claimed in claim 1 in which said tape cassette is smaller than a standard type tape cassette which is constructed to be loaded into a standard type recording and/or reproducing apparatus to perform recording and/or reproduction, and said recording and/or reproducing apparatus has a tape cassette loading part which is smaller than a tape cassette loading part of said standard type recording and/or reproducing apparatus.

4. A recording and/or reproducing apparatus as claimed in claim 1 in which said rotation transmitting mechanism transmits rotation to an outer peripheral part of a reel flange in said other reel.

5. A recording and/or reproducing apparatus as claimed in claim 4 in which said reel flange of said other reel has a gear part formed at the outer peripheral part thereof, and said rotation transmitting mechanism has a gear wheel for meshing with the gear part of said reel flange to transmit rotation.

6. A recording and/or reproducing apparatus as claimed in claim 4 in which said other reel has an upper reel flange and a lower reel flange, and said rotation transmitting mechanism is constructed to transmit rotation to the lower flange of said other reel.

7. A recording and/or reproducing apparatus as claimed in claim 1 in which said other reel unitarily has a gear part having a diameter which is smaller than the diameter of its own reel flange, and said rotation transmitting mechanism has a gear wheel to transmit rotation to said gear part.

8. A recording and/or reproducing apparatus as claimed in claim 7 in which idler gears are provided with said cassette case, and the rotation of said gear wheel is transmitted to said gear part through said idler gears.

9. A recording and/or reproducing apparatus as claimed in claim 1 in which said other reel has a gear wheel which rotates unitarily with said other reel, said rotation transmitting mechanism has a gear wheel for meshing with said gear part to transmit rotation, and each tooth of at least one of said gear wheels has a tapered surface formed at the upper part thereof.

10. A recording and/or reproducing apparatus as claimed in claim 1 in which said tape cassette has a braking member for performing a braking action with respect to the other reel when urged downwards to make contact with a peripheral part of said other reel, and for releasing the braking action with respect to said other reel when moved upwards to depart from the peripheral part of said other reel, and said recording and/or reproducing apparatus has a raising member which is relatively inserted within said cassette case when said tape cassette is loaded into the predetermined position to raise said braking member.

11. A recording and/or reproducing apparatus as claimed in claim 10 in which said cassette case of said tape cassette is provided with a hole in the bottom thereof at a position opposing said braking member, and said raising member consists of a pin-shaped member for relatively entering into the hole in said cassette case to make contact with and push said braking member upwards.

12. A recording and/or reproducing apparatus as claimed in claim 11 in which said cassette case of said tape cassette is further provided with another hole in the bottom making a pair with said hole, said recording and/or reproducing apparatus is further provided with another pin-shaped member forming a pair with said pin-shaped member, and said pair of pin-shaped members relatively enter into said pair of holes in said cassette case when said tape cassette is loaded into the predetermined position, to locate said cassette case to said predetermined position.

13. A recording and/or reproducing apparatus as claimed in claim 1 in which said rotation transmitting mechanism comprises a rotary body for transmitting rotation to said other reel, and a moving mechanism for moving said rotary body from a position for not transmitting rotation to said other reel to a position for transmitting rotation to said other reel, in relation to the loading operation of said tape cassette into said predetermined position.

14. A recording and/or reproducing apparatus as claimed in claim 13 in which said moving mechanism comprises urging means for urging said rotary body to move towards the position for transmitting rotation to said other reel, holding means for locking said rotary body against the urging force of said urging means so that said rotary body does not move, and means for releasing the holding operation in relation to the loading operation of said tape cassette into said predetermined position.

15. A recording and/or reproducing apparatus as claimed in claim 14 in which said moving mechanism further has means for moving said rotary body against the urging force of said urging means to the position for not transmitting rotation to said other reel in relation to a unloading operation of said tape cassette from said loaded predetermined position, and said holding means in the released state locks again said rotary body in relation to moving of said rotary body to said position for not transmitting rotation.

16. A recording and/or reproducing apparatus as claimed in claim 1 further comprising:
a guide drum having rotary heads;
tape loading means for drawing the tape out of the tape cassette loaded into said predetermined position, and loading the tape unto a predetermined tape path making contact with said guide drum;
a head for audio signal and/or control signal which is at a position not interfering with the tape loading operation before the tape loading operation is performed by said tape loading means; and
means for moving said head for audio signal and/or control signal to a position making contact with said loaded tape, in relation to the tape loading operation performed by said tape loading means.

* * * * *